United States Patent
Gidon et al.

(10) Patent No.: US 7,209,429 B2
(45) Date of Patent: Apr. 24, 2007

(54) DATA RECORDING DEVICE COMPRISING MICRO-TIPS AND A RECORDING MEDIUM

(75) Inventors: Serge Gidon, La Murette (FR); Yves Samson, Saint Martin d'Heres (FR); Olivier Bichet, Royston (GB); Bernard Bechevet, Claix (FR)

(73) Assignee: Commissariat a l'Energie Atomique, Paris (FR)

(*) Notice: Subject to any disclaimer, the term of this patent is extended or adjusted under 35 U.S.C. 154(b) by 14 days.

(21) Appl. No.: 10/526,391

(22) PCT Filed: Jun. 7, 2004

(86) PCT No.: PCT/FR2004/001406

§ 371 (c)(1), (2), (4) Date: Mar. 2, 2005

(87) PCT Pub. No.: WO2005/004140

PCT Pub. Date: Jan. 13, 2005

(65) Prior Publication Data

US 2005/0286395 A1 Dec. 29, 2005

(30) Foreign Application Priority Data

Jun. 13, 2003 (FR) .................................. 03 07158

(51) Int. Cl.
*G11B 9/04* (2006.01)

(52) U.S. Cl. ...................... 369/126; 369/101; 369/286; 369/288

(58) Field of Classification Search ................ 369/126; 365/46

See application file for complete search history.

(56) References Cited

U.S. PATENT DOCUMENTS 5,072,116 A * 12/1991 Kawade et al. ............. 250/306

(Continued)

FOREIGN PATENT DOCUMENTS

EP 0 750 298 A2 12/1996

(Continued)

OTHER PUBLICATIONS

H. Kado et al "Nanometer-scale recording on chalcogenide films with an atomic force microscope". Appl. Phys., Letter, vol. 66, No. 22, pp. 2961-2962; May 29, 1995.

*Primary Examiner*—Wayne Young
*Assistant Examiner*—LaTanya Bibbins
(74) *Attorney, Agent, or Firm*—Oliff & Berridge, PLC

(57) ABSTRACT

The invention relates to a data recording device comprising microtips and a recording medium. The recording medium comprises a substrate with a preferably-carbon resistive layer disposed thereon, said resistive layer being covered with an active layer. According to the invention, the aforementioned active layer can pass from a first electrical resistivity value to a second electrical resistivity value when a voltage is applied between the microtips and a counter electrode. The inventive data recording device also comprises at least one carbon resistive element which is disposed between the active layer and the microtips.

17 Claims, 1 Drawing Sheet

U.S. PATENT DOCUMENTS

| | | | |
|---|---|---|---|
| 5,335,219 A * | 8/1994 | Ovshinsky et al. | 369/288 |
| 5,353,268 A * | 10/1994 | Hintz | 369/13.35 |
| 5,402,410 A * | 3/1995 | Yoshimura et al. | 369/275.1 |
| 5,646,740 A * | 7/1997 | Webster et al. | 358/296 |
| 5,751,686 A * | 5/1998 | Kuroda et al. | 369/126 |
| 6,352,753 B2 * | 3/2002 | Nonaka et al. | 428/64.1 |
| 6,392,934 B1 * | 5/2002 | Saluel et al. | 365/189.01 |
| 6,757,235 B2 * | 6/2004 | Wickramasinghe et al. | 369/99 |
| 2002/0006735 A1 * | 1/2002 | Zahorik | 438/763 |
| 2002/0172072 A1 * | 11/2002 | Chen et al. | 365/151 |
| 2004/0113192 A1 * | 6/2004 | Wicker | 257/298 |

FOREIGN PATENT DOCUMENTS

| | | |
|---|---|---|
| JP | A 05-028549 | 2/1993 |
| JP | A 09-282723 | 10/1997 |
| JP | A 10-112083 | 4/1998 |

* cited by examiner

DATA RECORDING DEVICE COMPRISING MICRO-TIPS AND A RECORDING MEDIUM

BACKGROUND OF THE INVENTION

The invention relates to a data recording device comprising micro-tips and a recording medium comprising a substrate whereon there is arranged a resistive layer, said resistive layer being covered by an active layer able to switch from a first electrical resistivity value to a second electrical resistivity value due to the action of a voltage applied between the micro-tips and a counter-electrode.

STATE OF THE ART

Data recording, both in the computing field and in the multimedia field, has to meet an increasing need for capacity and therefore requires an increased storage density. Recently, large storage capacities, of about a Terabit/cm$^2$, have been obtained by implementing micro-tips of the same type as those used in the field of tip effect microscopy such as Atomic Force Microscopes (AFM) and Scanning Tunnel Microscopes (STM) . . . Thus, the article "Nanometer-scale recording on chalcogenide films with an atomic force microscope" by H. Kado et al. (Appl. Phys., Letter 66 (2), May 1995, pages 2961–2962) describes the use of micro-tips to record data on a recording medium comprising an active $GeSb_2Te_4$ film.

Thus, an electric current flowing from the micro-tips to a counter-electrode flows through the active layer of the medium so as to create zones with different electrical resistivities in the active layer. For example, the current flow induced by application of an electrical voltage enables the active layer to be made to switch locally from a first physical state to a second physical state, preferably by Joule effect heating.

The active layer is generally formed by a phase change material such as chalcogenides of the GeSbTe and AgInSbTe type which are already used in the optic recording field. Thus, reading of the memory points (bits) formed in the active layer can be performed by detecting the local variation of the electrical resistance of the recording medium, in contact mode, i.e. when the micro-tips are in contact with the recording medium.

However, the electrical resistance variation, in the write phase, may induce effects on the micro-tips and on the recording medium. The micro-tips and/or the recording medium may in fact be damaged by an excessive electric current induced under the micro-tips in the write phase. To avoid such problems, it has in particular been proposed in the document U.S. Pat. No. 5,751,686 to arrange a resistive film limiting the current between the active layer and the substrate, the film being for example able to be an silicon oxide or nitride.

The abstract of the patent application JP-A-10,112,083 proposes arranging a protective layer of diamond or diamond like carbon on an active layer formed by a semi-conducting $GeSb_2Te_4$ thin film so as to protect the latter from the damage caused by abrasion and wear when a tip is in contact with the recording medium comprising the active layer.

These different solutions do not however enable a satisfactory recording device to be obtained from the electrical, thermal and mechanical properties point of view.

OBJECT OF THE INVENTION

The object of the invention is to achieve a data recording device remedying the shortcomings set out above and having, more particularly, a large storage density while keeping and even increasing the detection contrast when the data is read.

According to the invention, this object is achieved by the appended claims.

More particularly, this object is achieved by the fact that at least one resistive element made of carbon is arranged between the active layer and the micro-tips, the resistive element having a controlled electrical resistivity comprised between the first and second electrical resistivity values of the active layer.

According to a development of the invention, the resistive layer is made of carbon.

According to another development of the invention, the resistive element has an electrical resistivity comprised between the first and second electrical resistivity values of the active layer.

According to a preferred embodiment, the resistive element comprises doping elements designed to adjust the electrical resistivity of the resistive element, the doping elements being chosen from boron and phosphorous.

According to another feature of the invention, the resistive layer has an electrical resistivity comprised between the first and second electrical resistivity values of the active layer.

According to another development of the invention, the resistive layer comprises doping elements designed to adjust the electrical resistivity of the resistive layer, the doping elements being chosen from boron, phosphorous, silver and copper.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
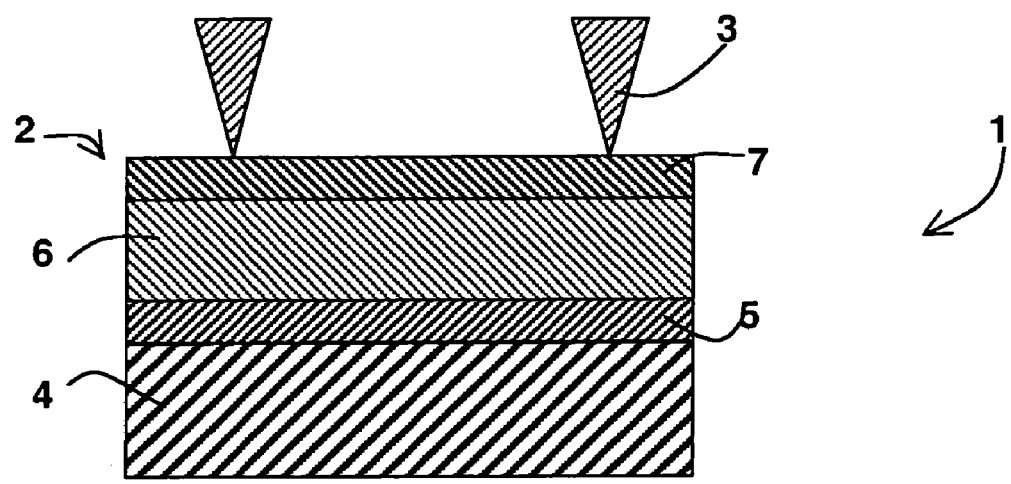
FIG. 1 is a schematic representation, in cross-section, of a first embodiment of a data recording device according to the invention.

In a particular embodiment represented in FIG. 1, a data recording device 1 comprises a recording medium 2 and micro-tips 3. The recording medium 2 comprises a substrate 4 whereon there is arranged a resistive layer 5. The resistive layer 5 is preferably made of carbon or, for example, from another material such as chalcogenides, and it is covered by an active layer 6 in which memory points (bits) can be recorded by means of the flow of an electric current coming from the micro-tips 3. Thus, the active layer 6 is able to switch from a first electrical resistivity value to a second electrical resistivity value due to the action of a voltage applied between the micro-tips and a counter-electrode. The counter-electrode 4 can, for example, be formed by the substrate 4 when the latter is conducting. The substrate 4 can thus be made of doped silicon, for example doped by antimony or boron, so as to achieve an electrical resistivity comprised between 0.01 and 1 Ohm·cm. When the substrate 4 is made of insulating material, the counter-electrode can be constituted by a conducting layer arranged on the substrate 4. The recording device 1 also comprises at least one resistive element 7 made of carbon arranged between the active layer and the micro-tips 3 and preferably having a thickness of about 1 nm. In FIG. 1, the resistive element 7 made of carbon is constituted by a layer arranged on the active layer 6.

The active layer 6 preferably has a thickness smaller than or equal to 50 nm and it is preferably constituted by a phase change material, for example a germanium, antimony and tellurium compound such as $Ge_2Sb_2Te_5$ or a silver, indium, antimony and tellurium compound (AgInSbTe). Under the action of Joule effect heating due to the flow of an electric current induced by application of an electric voltage, such phase change materials are in fact capable of switching from a first phase presenting a first electrical resistivity value to a second phase presenting a second electrical resistivity value different from the first value. For example, after writing, an active layer of $Ge_2Sb_2Te_5$ compound comprises a plurality of first zones constituted by amorphous $Ge_2Sb_2Te_5$ and a plurality of second zones forming the memory points (bits) and constituted by crystalline $Ge_2Sb_2Te_5$. The electrical resistivity of crystalline $Ge_2Sb_2Te_5$ is about 0.1 Ohm·cm whereas the electrical resistivity of the amorphous $Ge_2Sb_2Te_5$ is about 100 Ohm·cm.

The resistive layer 5 made of carbon preferably has a thickness comprised between 5 nm and 50 nm and it presents an electrical resistivity enabling the current to flow from the micro-tips 3 to the substrate 4 with a controlled intensity. The resistive layer 5 can for example be formed by a cathode sputtering, this technique enabling the electrical resistivity of the resistive layer 5 to be controlled. The electrical resistivity of the resistive layer 5 can thus be adjusted to a preset value by adding, in the carbon resistive layer 5, doping elements chosen from boron, silver, phosphorous and copper in proportions comprised between 0.1% and 10% for silver and copper and 1 ppm to 0.1% for boron and phosphorous. Doping can notably be performed by adding a pad with a diameter of about 1 $cm^2$ formed by a doping element to the carbon sputtering target. Doping in this way thus enables the electrical resistivity of the resistive layer 5 to be controlled so as to obtain an electrical resistivity comprised between the first and second electrical resistivity values of the active layer 6. The electrical resistivity of the resistive layer 5 is preferably about 1 Ohm·cm.

The resistive layer 5 is also able to promote local variation of the electrical resistivity in the active layer 6, and in particular the transition from one phase to the other in the case of an active layer 6 made of phase change material. It thus preferably has a thermal resistance enabling a temperature to be guaranteed suitable for transition from one phase to another in the active layer 6. In addition, the resistive layer 5 ensures in-depth heating in the active layer 6, which enables the volume affected by the phase change in the active layer 6 to be increased and therefore fosters the electrical resistance contrast when reading the memory points created.

Figure 2:
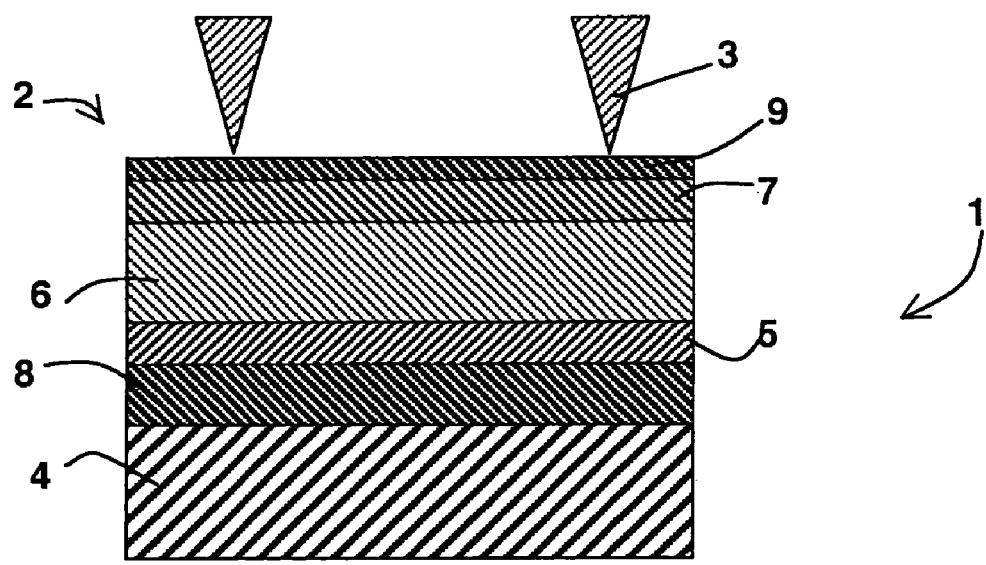
FIG. 2 is a schematic representation, in cross-section, of a second embodiment of a device according to the invention.

The thermal resistance of the resistive layer 5 can also be enhanced by a thermally insulating layer 8 arranged between the substrate 4 and the active layer 6, as represented in FIG. 2. The thermally insulating layer 8 can for example be formed by a crystallized germanium, antimony and tellurium compound by any known type of thermal process such as momentary heating of the recording medium partially made of a binary compound such as GeTe. The thermally insulating layer can also act as counter-electrode instead of the substrate when the latter is insulating.

The resistive element 7 presents a controlled electrical resistivity enabling an electrical contact to be established between the active layer 6 and the micro-tips 3. Thus, the electrical resistivity of the resistive element 7 is preferably comprised between the first and second electrical resistivity values of the active layer 6 and the thickness of the resistive element 7 is preferably about 1 nm. The value of the electrical resistivity and the thickness of the resistive element 7 enable a suitable electrical resistance contrast to be obtained between the zones having different electrical resistivities, when reading of the recording medium is performed.

The electrical resistivity of the resistive element 7 can thus be adjusted by any type of known means and, in particular, by doping the resistive element with doping elements chosen from boron and phosphorous. For example, in the case of an active layer made of GeSbTe, the resistive element 7 has an electrical resistivity comprised between 1 and 10 Ohm·cm and a thickness of about 1 nm. In order to easily control the electrical resistivity of the resistive element 7, the latter can be achieved by a cathode sputtering process by adjusting the pressure and composition of the plasma or by a gas cracking deposition process of the plasma enhanced chemical vapor deposition (PECVD) type, the gas being able for example to be methane or carbon monoxide.

The electrical resistivity of the resistive element 7 is therefore adjusted so as to enable a sufficient current input from the micro-tips to the active layer 6, with a controlled intensity. The resistive element 7 also comprises a thermal resistance enabling the phase changes to be induced in the active layer when a voltage is applied. It also enables the active layer to be protected against surface pollution phenomena such as oxidation effects. A protective layer 9 of carbon can also be deposited on the resistive element 7 (FIG. 2) so as to enhance the tribological properties of the resistive element 7.

The respectively electrical resistivities of the resistive layer 5 and of the resistive element 7 are thus adjusted according to the apparent resistance contrast of the active layer 6. This enables in particular a risk of a low contrast between the apparent electrical resistivities of two zones of different state of the active layer 6 to be palliated when reading of the recording medium is performed. It is commonplace for a lateral diversion of a part of the read current in the layer arranged on the active layer to take place, this causing a low electrical resistivity contrast.

The resistive layer 5 and the resistive element 7 also enable sufficient heating to be ensured in the whole of the active layer 6 so as to induce the required change of state when the current is injected in a write stage. As the geometry of the volume affected by the change of state directly influences the contrast when read of the data is performed, the resistive layer 5 enables heating to be obtained over the whole of the thickness of the active layer. In addition, such a device enables an excessive increase of the current injected into the active layer 6 to be avoided, when the latter switches to the low resistivity state.

The invention claimed is:

1. Data recording device comprising micro-tips and a recording medium comprising a substrate whereon there is arranged a resistive layer, said resistive layer being covered by an active layer able to switch from a first electrical resistivity value to a second electrical resistivity value due to the action of a voltage applied between the micro-tips and a counter-electrode, device wherein at least one resistive element made of carbon is arranged between the active layer and the micro-tips, the resistive element having a controlled electrical resistivity comprised between the first and second electrical resistivity values of the active layer.

2. Recording device according to claim 1, wherein the resistive layer is made of carbon.

3. Recording device according to claim 1, wherein the resistive element comprises doping elements designed to adjust the electrical resistivity of the resistive element, the doping elements being chosen from boron and phosphorous.

4. Recording device according to claim 1, wherein the resistive element has a thickness of about 1 nm.

5. Recording device according to claim 1, wherein the resistive element is a layer arranged on the active layer.

6. Recording device according to claim 1, wherein the resistive layer has an electrical resistivity comprised between the first and second electrical resistivity values of the active layer.

7. Recording device according to claim 1, wherein the resistive layer has a thickness comprised between 5 and 50 nm.

8. Recording device according to claim 1, wherein the resistive layer comprises doping elements designed to adjust the electrical resistivity of the resistive layer, the doping elements being chosen from boron, phosphorous, silver and copper.

9. Recording device according to claim 1, wherein it comprises a protective layer of carbon arranged on the resistive element.

10. Recording device according to claim 1, wherein it comprises a thermally insulating layer arranged between the substrate and the resistive layer.

11. Recording device according to claim 10, wherein the thermally insulating layer is formed by a crystallized germanium, antimony and tellurium compound.

12. Recording device according to claim 11, wherein the crystallized germanium, antimony and tellurium compound is obtained by momentary heating of the partially achieved recording medium.

13. Recording device according to claim 11, wherein the crystallized germanium, antimony and tellurium compound is obtained from a binary germanium and tellurium compound.

14. Recording device according to claim 1, wherein the active layer is formed by a phase change material.

15. Recording device according to claim 1, wherein the active layer has a thickness smaller than or equal to 50 nm.

16. Recording device according to claim 1, wherein the substrate being conducting, it constitutes the counter-electrode.

17. Recording device according to claim 16, wherein the substrate is made of doped silicon.

* * * * *